US012605819B2

(12) United States Patent
Pedersen

(10) Patent No.: US 12,605,819 B2
(45) Date of Patent: Apr. 21, 2026

(54) ENHANCED SAWHORSE ASSEMBLY

(71) Applicant: Mark Pedersen, Isle, MN (US)

(72) Inventor: Mark Pedersen, Isle, MN (US)

( * ) Notice: Subject to any disclaimer, the term of this patent is extended or adjusted under 35 U.S.C. 154(b) by 513 days.

(21) Appl. No.: 18/110,201

(22) Filed: Feb. 15, 2023

(65) Prior Publication Data

US 2024/0269820 A1 Aug. 15, 2024

(51) Int. Cl.
*B25H 1/06* (2006.01)

(52) U.S. Cl.
CPC .................................... *B25H 1/06* (2013.01)

(58) Field of Classification Search
CPC ........................................................ B25H 1/06
USPC ........................................................ 182/153
See application file for complete search history.

(56) References Cited

U.S. PATENT DOCUMENTS 1,680,065 A 8/1928 Proctor
1,838,151 A * 12/1931 Penote .................... E01F 13/02 256/64
3,616,873 A 11/1971 Kehrig
3,631,941 A 1/1972 Greenman
5,119,903 A 6/1992 Ulshafer
5,467,842 A * 11/1995 Meloy ...................... B25H 1/06 182/151
6,892,859 B2 * 5/2005 van der Pol ............. B25H 1/06 182/225
11,110,588 B1 * 9/2021 van der Pol ............. B25H 1/08
2005/0199443 A1 9/2005 Slavich
2011/0056768 A1 3/2011 Budreau
2014/0231173 A1 * 8/2014 Carter ...................... B25H 1/14 182/129

* cited by examiner

*Primary Examiner* — Daniel J Troy

(57) ABSTRACT

An enhanced sawhorse assembly for positioning from a closed position to an open position includes a plurality of legs. The legs are positionable from the closed position to the open position. The closed position is defined by the legs being positioned parallel to each other and the open position is defined by the legs being angled relative to each other such that an acute angle is formed between the legs from a top to a bottom of the assembly. A saddle is coupled to the legs and is supported upright by the legs in the open position. A pair of tethers is coupled to the legs and facilitates positioning the legs into the open position. A base plate is elongated and is coupled to the saddle and a beam of wood is elongated and is removably coupled thereto. A fastener removably couples the beam of wood to the base plate.

13 Claims, 7 Drawing Sheets

ENHANCED SAWHORSE ASSEMBLY

CROSS-REFERENCE TO RELATED APPLICATIONS

Not Applicable

STATEMENT REGARDING FEDERALLY SPONSORED RESEARCH OR

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sawhorses and more particularly pertains to a new sawhorse for having a removable beam of wood and positioning from a closed position to an open position.

(2) Description of Related Art Including Information Disclosed Under 37 CFR 1.97 and 1.98

The prior art relates to sawhorses and includes a variety of sawhorses comprising a plurality of legs coupled to a saddle. Known prior art does not include a plurality of legs being pivotally positionable from a closed position to an open position and having a beam of wood being removably fastened to a saddle.

BRIEF SUMMARY OF THE INVENTION

An embodiment of the disclosure meets the needs presented above by generally comprising a plurality of legs being positionable from a closed position to an open position. The closed position is defined by the legs being positioned parallel to each other and the open position is defined by the legs being angled relative to each other such that an acute angle is formed between the legs from a top to a bottom of the assembly. A saddle is coupled to the legs and is supported upright by the legs in the open position. The saddle includes a base tube having a pair of lateral ends. A pair of outer tubes is rotatably coupled to a respective one of the lateral ends of the base tube. A coupler pivotally positions the legs from the closed position to the open position. A pair of tethers is coupled to the legs and facilitates positioning the legs into the open position. A base plate is elongated and is coupled to the saddle and a beam of wood is elongated and is removably coupled the base plate. A fastener is configured for removably coupling the beam of wood to the base plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
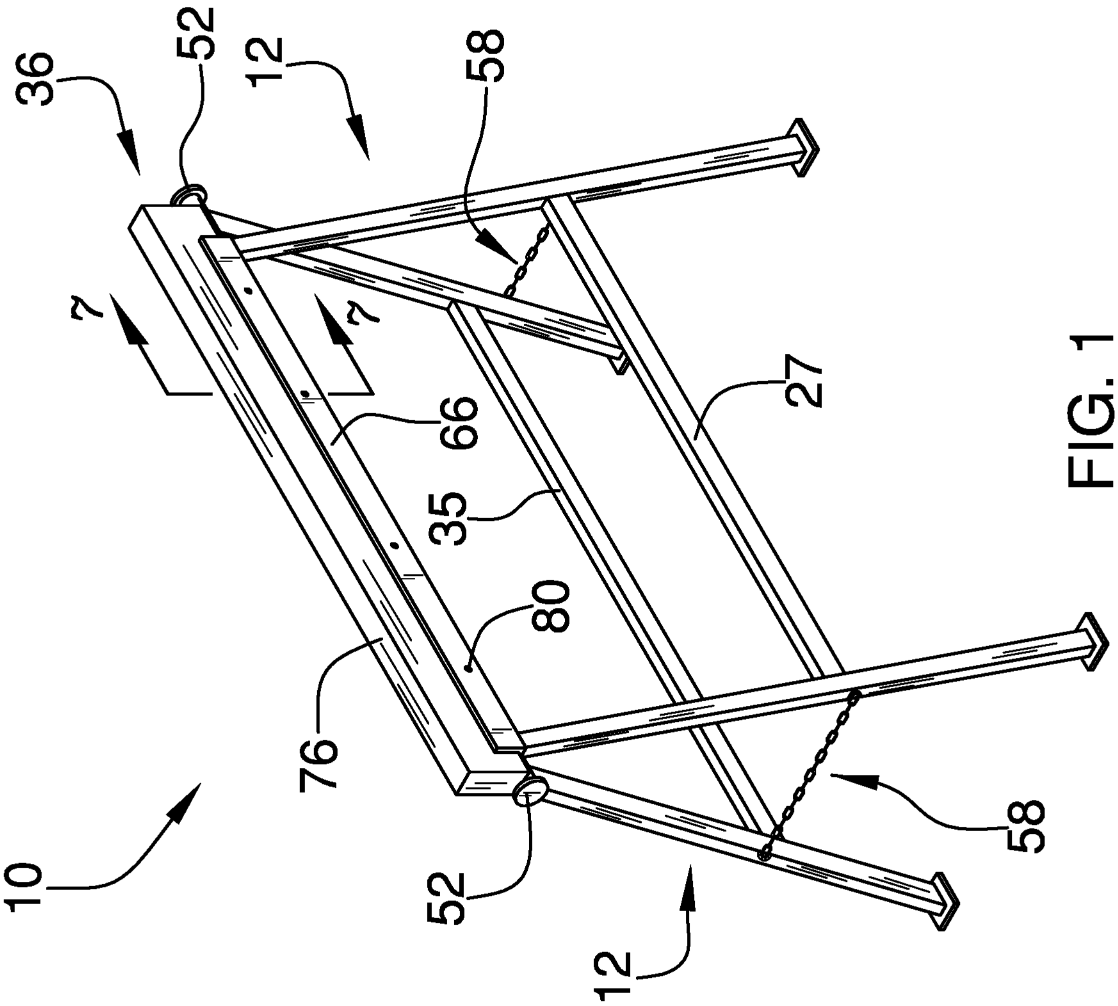
FIG. 1 is a front isometric view of an enhanced sawhorse assembly according to an embodiment of the disclosure.
Figure 2:
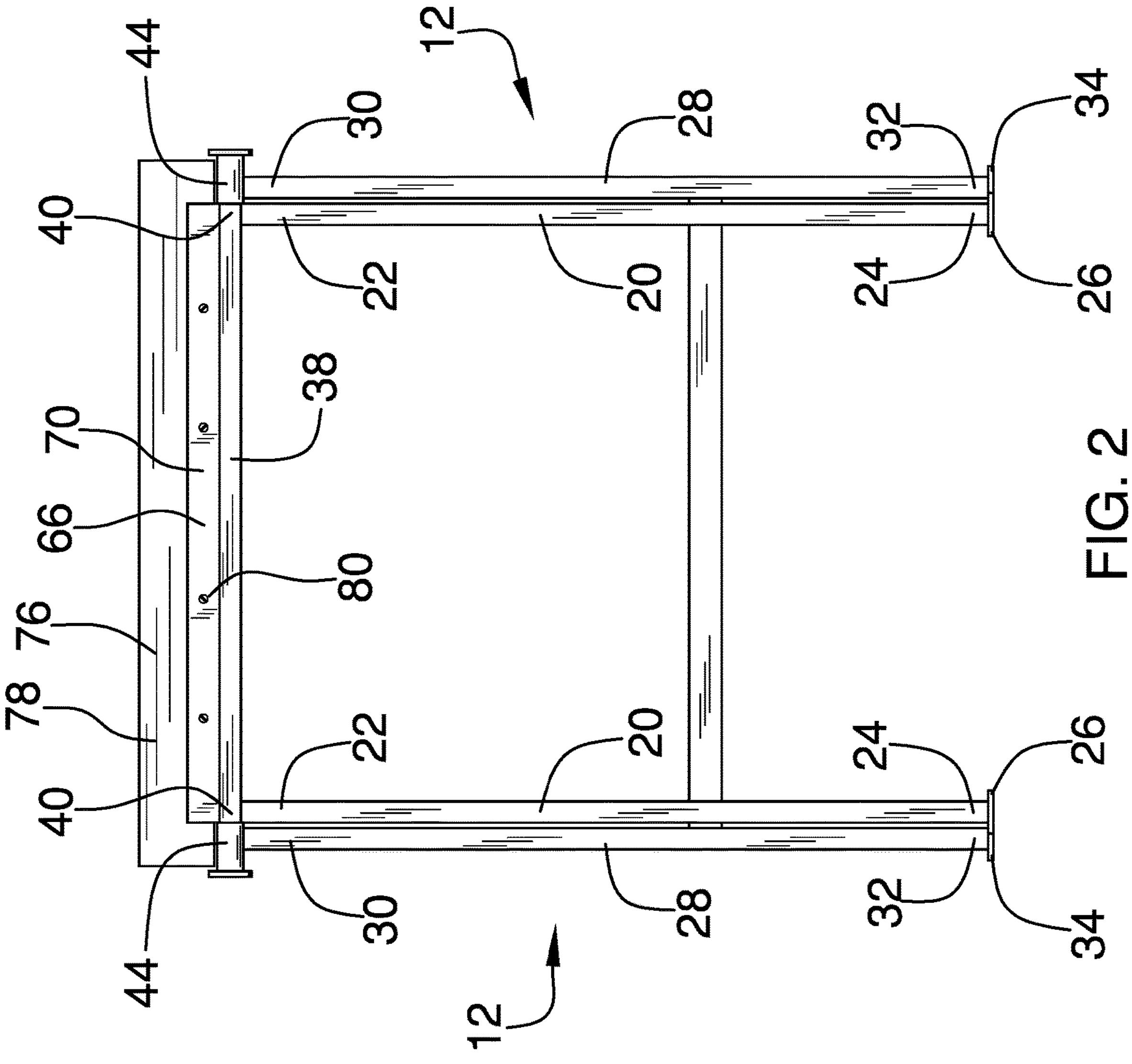
FIG. 2 is a front view of an embodiment of the disclosure.
Figure 4:
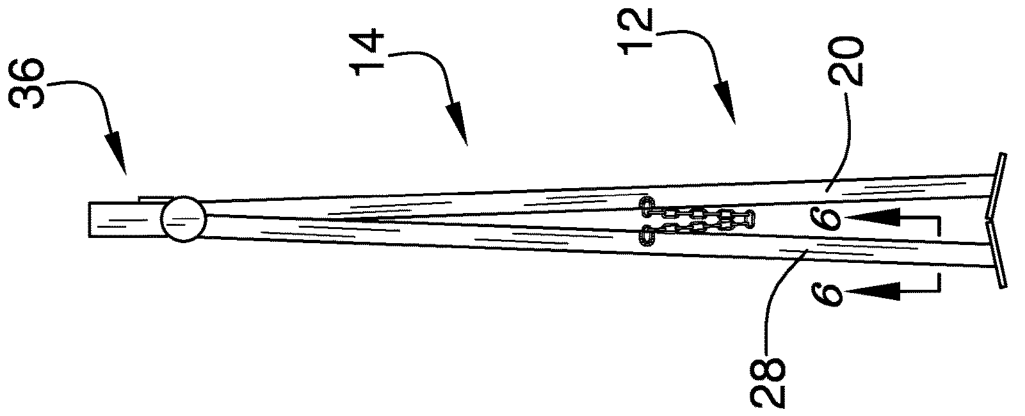
FIG. 4 is a side folded view of an embodiment of the disclosure.
Figure 3:
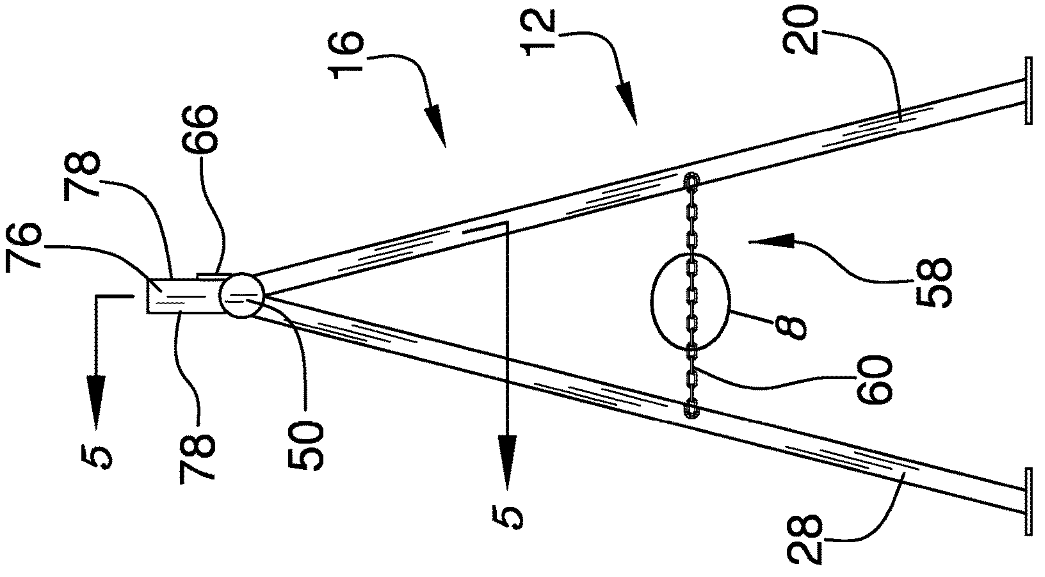
FIG. 3 is a side view of an embodiment of the disclosure.
Figure 5:
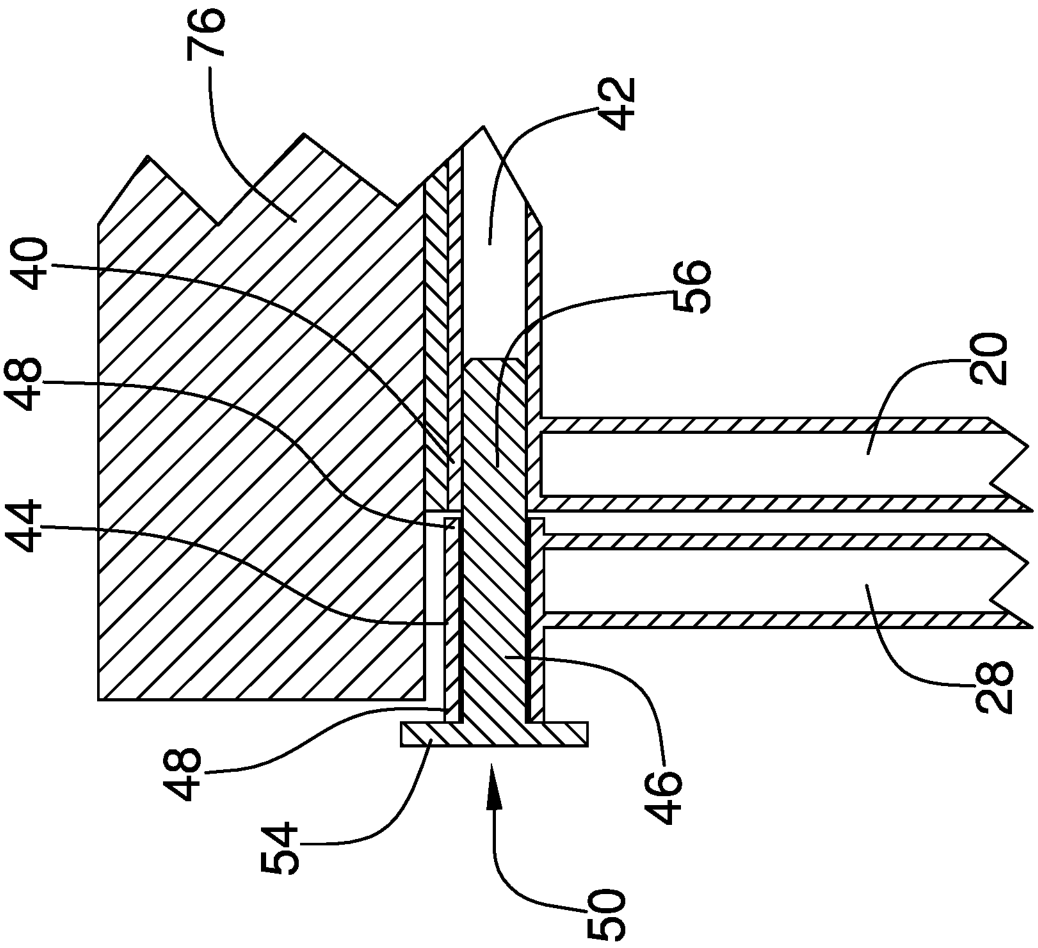
FIG. 5 is a cross-sectional view of an embodiment of the disclosure taken along Line 5-5 of FIG. 3.
Figure 7:
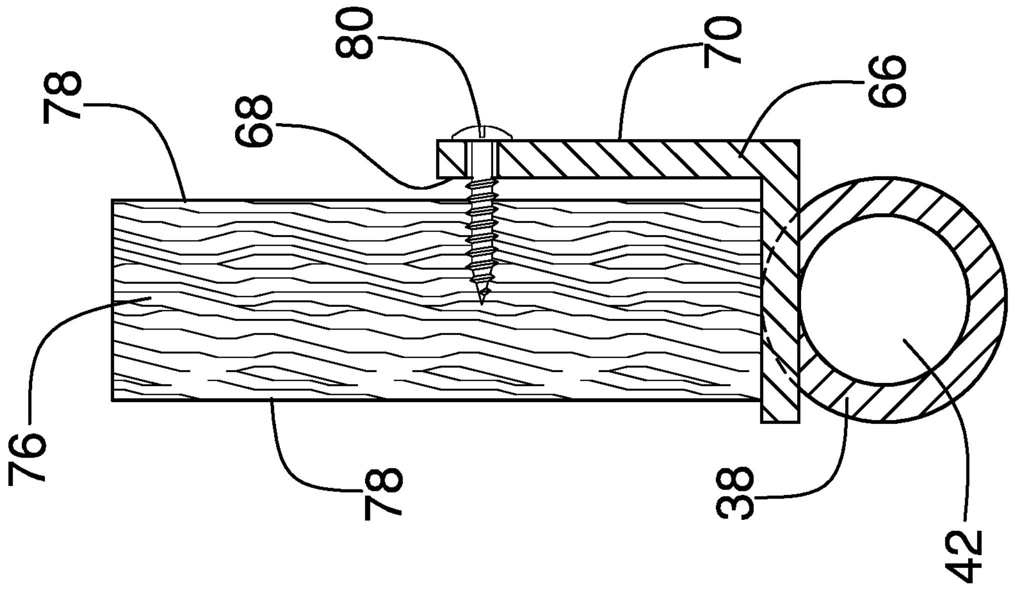
FIG. 7 is a cross-sectional view of an embodiment of the disclosure taken along Line 7-7 of FIG. 1.
Figure 6:
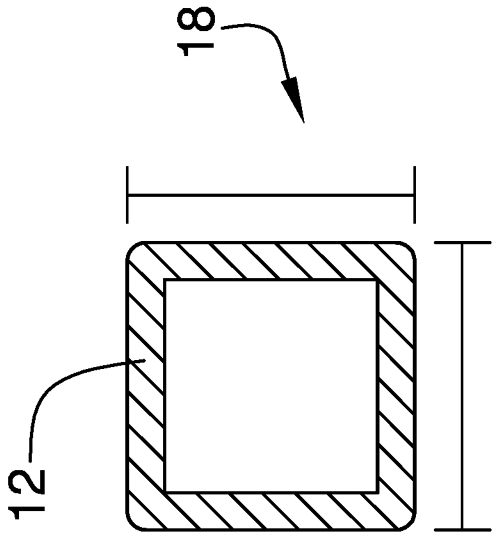
FIG. 6 is a cross-sectional view of an embodiment of the disclosure taken along Line 6-6 of FIG. 4.
Figure 8:
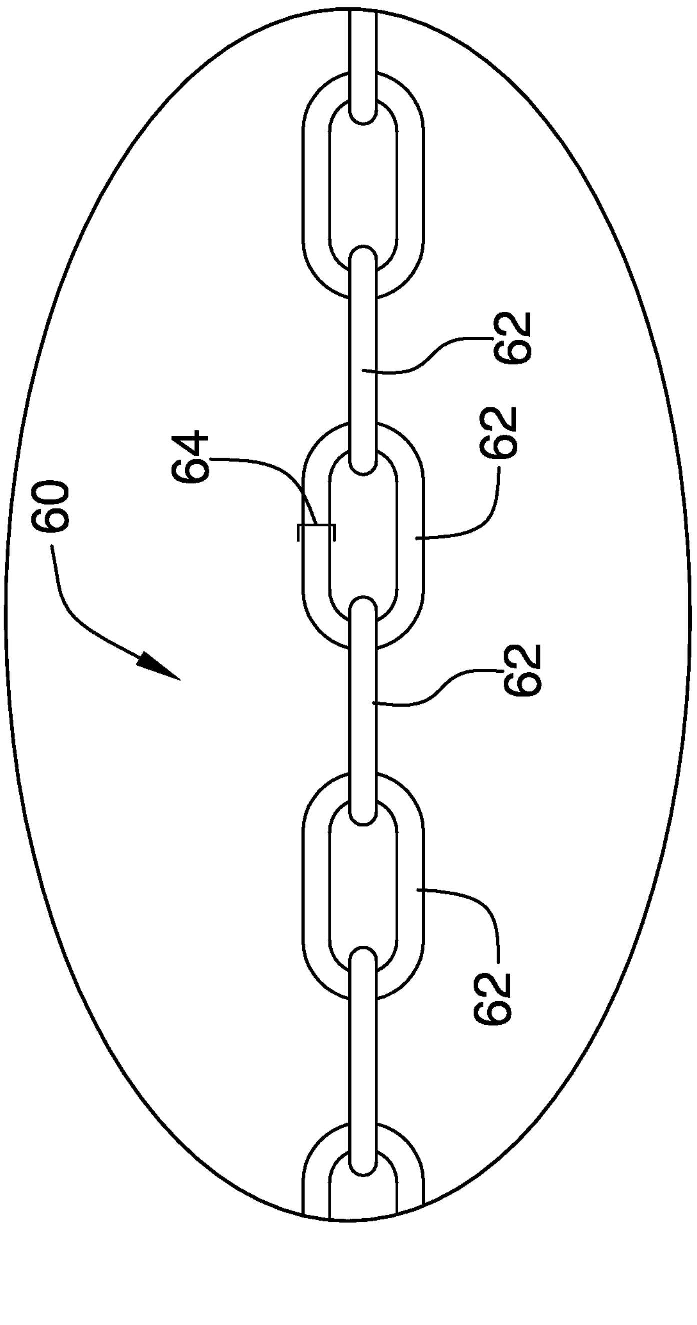
FIG. 8 is a detail view of an embodiment of the disclosure taken from Magnified Circle 8 of FIG. 3.
Figure 9:
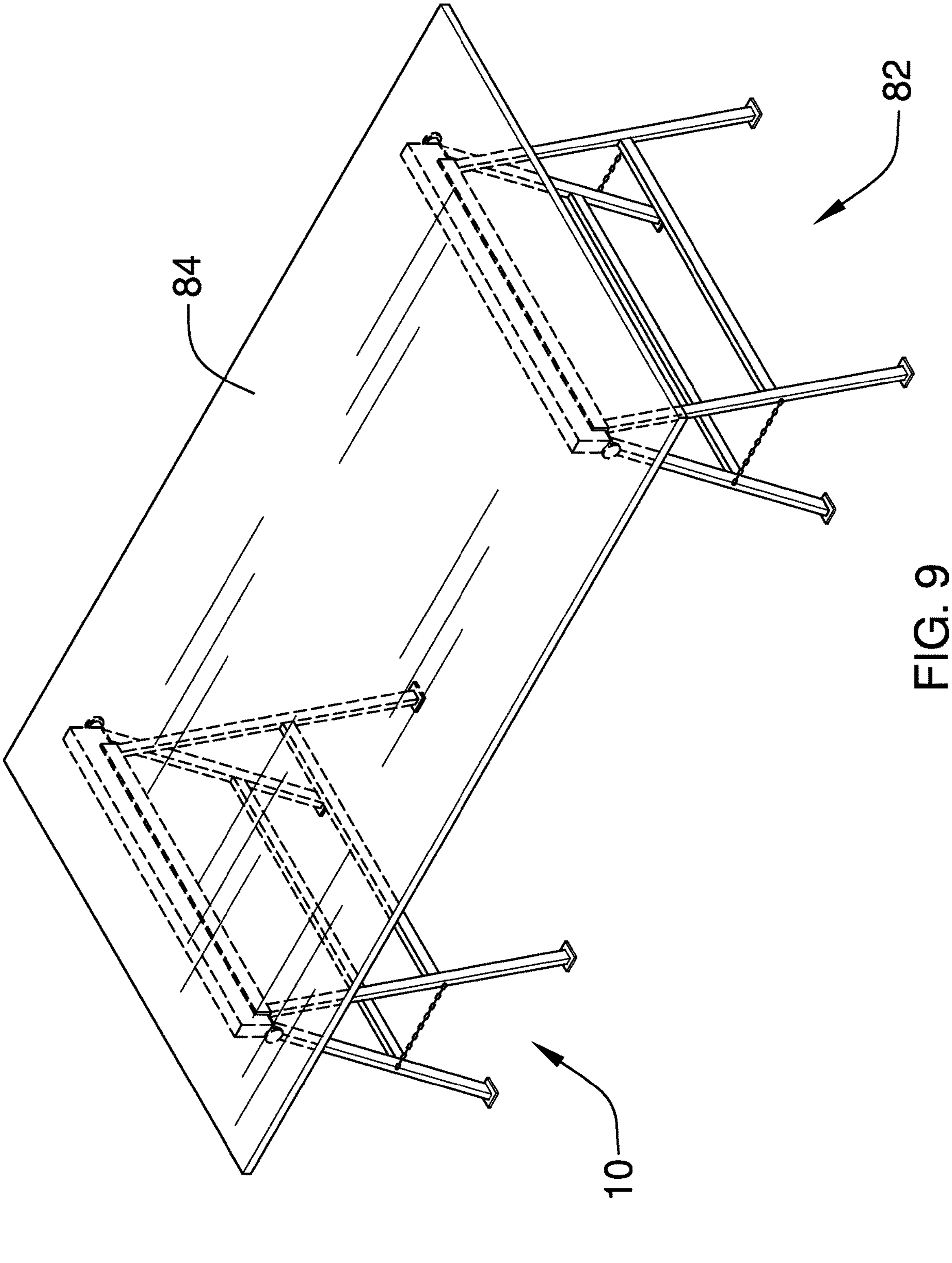
FIG. 9 is an in-use view of an embodiment of the disclosure.

With reference now to the drawings, and in particular to FIGS. 1 through 9 thereof, a new sawhorse embodying the principles and concepts of an embodiment of the disclosure and generally designated by the reference numeral 10 will be described.

As best illustrated in FIGS. 1 through 9, the enhanced sawhorse assembly 10 generally comprises a plurality of legs 12 being positionable from a closed position 14 to an open position 16. The closed position 14 is defined by the legs 12 being positioned parallel to each other and the open position 16 is defined by the legs 12 being angled relative to each other such that an acute angle is formed between the legs 12 from a top to a bottom of the assembly 10. Each leg 12 normally comprises a metal material being resilient to bending. Each leg 12 has a planar area 18 taken laterally along cross-sectional line and the planar area 18 of each leg is from 0.75 square inches to 1.25 square inches, wherein the planar area 18 of each leg is typically 1.00 square inches.

The legs 12 include a pair of center legs 20. Each center leg 20 has a top end 22 and a bottom end 24, and the bottom end 24 of each center leg 20 may have a center foot 26. A first connection bar 27 is coupled to each center leg 20 and is positioned perpendicular relative to the center legs 20. The first connection bar 27 is equally spaced between the top end 22 and the bottom end 24 of each center leg 20. Furthermore, the legs 12 include a pair of outer legs 28 being pivotally coupled to a respective one of the center legs 20. Each outer leg 28 has an upper end 30 and a lower end 32, and the lower end 32 of each outer leg 28 may have an outer foot 34. A second connection bar 35 is coupled to each outer leg 28. The second connection bar 35 is positioned perpendicular relative to the outer legs 28 and is equally spaced between the upper end 30 and the lower end 32 of each outer leg 28. The first 27 and second 35 connection bars may comprise a rigid material such as metal wherein the first connection bar 27 provides reinforcement to the pair of center legs 20 and the second connection bar 35 provides reinforcement to the pair of outer legs 28.

A saddle 36 is coupled to the legs 12 and is supported upright by the legs 12 in the open position 16. The saddle 36 typically includes a base tube 38 having a pair of lateral ends 40. The top end 22 of each center leg 20 is coupled to one of the lateral ends 40 of the base tube 38. The base tube 38 encloses an interior space 42 and each of the lateral ends 40 is open. A pair of outer tubes 44 is rotatably coupled to a respective one of the lateral ends 40 of the base tube 38. The upper end 30 of each outer leg 28 is coupled to one of the outer tubes 44. Each outer tube 44 encloses a receiving space 46 and each outer tube 44 has a pair of outer ends 48. Each outer end 48 is open.

A coupler 50 rotatably couples the outer tubes 44 to the base tube 38 and pivotally positions the legs 12 from the closed position 14 to the open position 16. The coupler 50 typically includes a pair of pivot pins 52 being coupled to a respective one of the outer tubes 44 and a respective one of the lateral ends 40 of the base tube 38. Each pivot pin 52 has a base 54 and a protrusion 56 coupled to and extending out from the base 54. The protrusion 56 is insertable through the outer ends 48 of one of the outer tubes 44 into one of the lateral ends 40 of the base tube 38, wherein the protrusion 56 is stored within the receiving space 46 and the interior space 42.

A pair of tethers 58 is coupled to the outer 28 and center 20 legs and facilitates positioning the outer 28 and center 20 legs into the open position 16. Each tether 58 normally comprises a chain 60 including a plurality of links 62 interlinking with each other. Each link 62 has a thickness 64 from 0.1406 inches to 0.2344 inches, wherein the thickness 64 of each link 62 typically is 0.1875 inches. Each tether 58 is coupled to a respective one of the center legs 20 and a respective one of the outer legs 28. The tethers 58 reinforce the legs 12 when stabilizing the saddle 36 upright in the open position 16.

A base plate 66 is elongated and is coupled to the saddle 36. The base plate 66 normally comprises a 1.5 inch angle iron having an inner surface 68 and an outer surface 70. The inner surface 68 may be coupled to the base tube 38. The base plate 66 is angled relative to the center legs 20, wherein the base plate 66 is position vertical relative to a ground surface 72 in the open position 16. The base plate 66 has a plurality of holes 74 positioned on the outer surface 70 extending through the base plate 66.

A beam of wood 76 is elongated and is removably coupled the base plate 66. The beam of wood 76 typically has a pair of lateral surfaces 78 and one of each lateral surface 78 is abuttable to the inner surface 68 of the base plate 66. A fastener 80 is configured for removably coupling the beam of wood 76 to the base plate 66. The fastener 80 comprises a plurality of screws being removably inserted through the holes 74 of the base plate 66 into the beam of wood 76 such that the screws retain the beam of wood 76 to the inner surface 68 of the base plate 66.

In use, the legs 12 of the sawhorse assembly 10 are pivotally positioned from the closed position 14 to the open position 16 by moving the center legs 20 away from the outer legs 28 until each of the tethers 58 restricts further movement between the legs 12. The outer foot 34 of each outer leg 28 and the center foot 26 of each center leg 20 may be abutted to the ground surface 72 to stabilize the saddle 36 upright in the open position 16, wherein the beam of wood 76 is positioned upright. The saddle 36 is capable of receiving a great amount of force downwardly upon the beam of wood 76 without fracturing the saddle 36 or the legs 12 of sawhorse assembly 10. A second assembly 82 may be positioned proximate to the sawhorse assembly 10 to support a sheet of plywood 84 upon each assembly to define a table. The assembly 10 may be positioned into the closed position 14 by moving the center legs 20 towards the outer legs 28 until each of the legs 12 are parallel to each other.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sawhorse assembly comprising:

a plurality of legs being positionable from a closed position to an open position, said closed position being defined by said legs being positioned parallel to each other and said open position being defined by said legs being angled relative to each other such that an acute angle being formed between the legs from a top to a bottom of said assembly;

a saddle being coupled to said legs and being supported upright by said legs in said open position, said saddle including:

a base tube having a pair of lateral ends;

a pair of outer tubes being rotatably coupled to a respective one of said lateral ends of said base tube;

a coupler pivotally positioning said legs from said closed position to said open position;

a pair of tethers being coupled to said legs and facilitating positioning said legs into said open position;

a base plate extending the entire length of the base tube, said base plate having said base plate having an L-shaped cross-sectional shape perpendicular to a longitudinal axis of said base plate, and said base plate being coupled to said saddle such that a single flange extends upwardly from said saddle above the base tube;

a beam of wood being elongated and being removably coupled said base plate; and a fastener being configured for removably coupling said beam of wood to said base plate.

2. The sawhorse assembly of claim 1, wherein said legs include a pair of center legs, each center leg having a top end and a bottom end, said bottom end of each center leg having a center foot.

3. The sawhorse assembly of claim 2, further including a first connection bar being coupled to each center leg, said first connection bar being positioned perpendicular relative to said center legs and being equally spaced between said top end and said bottom end of each center leg.

4. The sawhorse assembly of claim 2, further including said plurality of legs including a pair of outer legs being pivotally coupled to a respective one of said center legs, each outer leg having an upper end and a lower end, said lower end of each outer leg having an outer foot.

5. The sawhorse assembly of claim 4, further including a second connection bar being coupled to each outer leg, said second connection bar being positioned perpendicular relative to said outer legs and being equally spaced between said upper end and said lower end of each outer leg.

6. The sawhorse assembly of claim 2, wherein said top end of each center leg is coupled to one of said lateral ends of said base tube, said base tube enclosing an interior space, each of said lateral ends being open.

7. The sawhorse assembly of claim 4, wherein said upper end of each outer leg is coupled to one of said outer tubes, each outer tube enclosing a receiving space, each outer tube having a pair of outer ends, each outer end being open.

8. The sawhorse assembly of claim 7, wherein said coupler is rotatably coupled said outer tubes to said base tube, said coupler including a pair of pivot pins being coupled to a respective one of said outer tubes and a respective one of said lateral ends of said base tube, each pivot pin has a base and a protrusion coupled to and extending out from said base, said protrusion being insertable through said outer ends of one of said outer tubes into one of said lateral ends of said base tube, wherein said protrusion is stored within said receiving space and said interior space.

9. The sawhorse assembly of claim 4, wherein each tether is coupled to a respective one of said center legs and a respective one of said outer legs.

10. The sawhorse assembly of claim 4, wherein said base plate has an inner surface and an outer surface, said inner surface being coupled to said base tube, said base plate being angled relative to said center legs, wherein said base plate being position vertical relative to a ground surface in said open position, said base plate having a plurality of holes positioned on said outer surface and extending therethrough.

11. The sawhorse assembly of claim 10, wherein said beam of wood has a pair of lateral surfaces, one of said lateral surfaces being abuttable to said inner surface of said base plate.

12. The sawhorse assembly of claim 11, wherein said fastener comprises a plurality of screws being removably inserted through said holes of said base plate into said beam of wood such that said screws retain said beam of wood to said inner surface of said base plate.

13. A sawhorse assembly comprising:

a plurality of legs being positionable from a closed position to an open position, said closed position being defined by said legs being positioned parallel to each other and said open position being defined by said legs being angled relative to each other such that an acute angle being formed between the legs from a top to a bottom of said assembly, said legs including:

a pair of center legs, each center leg having a top end and a bottom end, said bottom end of each center leg having a center foot, a first connection bar being coupled to each center leg, said first connection bar being positioned perpendicular relative to said center legs and being equally spaced between said top end and said bottom end of each center leg; and a pair of outer legs being pivotally coupled to a respective one of said center legs, each outer leg having an upper end and a lower end, said lower end of each outer leg having an outer foot, a second connection bar being coupled to each outer leg, said second connection bar being positioned perpendicular relative to said outer legs and being equally spaced between said upper end and said lower end of each outer leg;

a saddle being coupled to said legs and being supported upright by said legs in said open position, said saddle including:

a base tube having a pair of lateral ends, said top end of each center leg being coupled to one of said lateral ends of said base tube, said base tube enclosing an interior space, each of said lateral ends being open;

a pair of outer tubes being rotatably coupled to a respective one of said lateral ends of said base tube, said upper end of each outer leg being coupled to one of said outer tubes, each outer tube enclosing a receiving space, each outer tube having a pair of outer ends, each outer end being open;

a coupler rotatably coupling said outer tubes to said base tube and pivotally positioning said legs from said closed position to said open position, said coupler including a pair of pivot pins being coupled to a respective one of said outer tubes and a respective one of said lateral ends of said base tube, each pivot pin has a base and a protrusion coupled to and extending out from said base, said protrusion being insertable through said outer ends of one of said outer tubes into one of said lateral ends of said base tube, wherein said protrusion is stored within said receiving space and said interior space;

a pair of tethers being coupled to said legs and facilitating positioning said legs into said open position, each tether being coupled to a respective one of said center legs and a respective one of said outer legs;

a base plate said base plate extending the entire length of the base tube, said base plate having, said base plate having an L-shaped cross-sectional shape perpendicular to a longitudinal axis of said base plate, and said base plate being coupled to said saddle such that a single flange extends upwardly from said saddle above the base tube, said base plate having an inner surface and an outer surface, said inner surface being coupled to said base tube, said base plate being angled relative to said center legs, wherein said base plate being position vertical relative to a ground surface in said open position, said base plate having a plurality of holes positioned on said outer surface and extending therethrough;

a beam of wood being elongated and being removably coupled said base plate, said beam of wood having a pair of lateral surfaces, one of said lateral surfaces being abuttable to said inner surface of said base plate; and a fastener being configured for removably coupling said beam of wood to said base plate, said fastener comprising a plurality of screws being removably inserted through said holes of said base plate into said beam of wood such that said screws retain said beam of wood to said inner surface of said base plate.

* * * * *